US012147802B2

(12) United States Patent
Seery et al.

(10) Patent No.: US 12,147,802 B2
(45) Date of Patent: Nov. 19, 2024

(54) SYSTEMS AND METHODS FOR SOFTWARE DEPLOYMENT DATA EXTRACTION AND VISUALIZATION

(71) Applicant: FMR LLC, Boston, MA (US)

(72) Inventors: Mary Seery, Boston, MA (US); Edward O'Loughlin, Boston, MA (US); Oluchi Anyabuike, Boston, MA (US); Patricia Linehan, Boston, MA (US)

(73) Assignee: FMR LLC, Boston, MA (US)

( * ) Notice: Subject to any disclaimer, the term of this patent is extended or adjusted under 35 U.S.C. 154(b) by 227 days.

(21) Appl. No.: 17/721,644

(22) Filed: Apr. 15, 2022

(65) Prior Publication Data
US 2023/0333847 A1    Oct. 19, 2023

(51) Int. Cl.
*G06F 8/71*    (2018.01)
*G06F 8/73*    (2018.01)

(52) U.S. Cl.
CPC . *G06F 8/73* (2013.01); *G06F 8/71* (2013.01)

(58) Field of Classification Search
CPC ......................................................... G06F 8/71
See application file for complete search history.

(56) References Cited

U.S. PATENT DOCUMENTS

2018/0373502 A1* 12/2018 Ganninger ................. G06F 8/34
2020/0005219 A1*  1/2020 Stevens ...................... G06F 8/71

OTHER PUBLICATIONS https://www.logdna.com/?utm_campaign=gg_dg_nam_search_acqusition_generic_logging_en_combo&utm_source=google&utm_medium=cpc&utm_content=log_parser&utm_term=parsing%20logs&gclid=CjwKCAjw55-HBhAHEiwARMCsziCaK09p9aOdUcMWxzE23vC3RJ6RLs9XaWWBQXRTntQ2FBkHBcalhxoC_TgQAvD_BwE, 4 pages, available prior to Apr. 15, 2022.
https://about.gitlab.com/stages-devops-lifecycle/, 15 pages, available prior to Apr. 15, 2022.

* cited by examiner

*Primary Examiner* — Duy Khuong T Nguyen
(74) *Attorney, Agent, or Firm* — Cesari and McKenna, LLP (57) ABSTRACT

A computerized method is provided for extracting and visualizing data related to software development. The method includes receiving, by a computing device, a plurality of logs corresponding to respective ones of a plurality of code repositories associated with developing the software. Each code repository includes a Version Control System (VCS) configured to maintain the corresponding log and a plurality of code files associated with the development of the software over a time period. The method also includes extracting data from each log data, including dates of commit and commit messages over the time period associated with the code files. The method further includes analyzing the extracted data across the plurality of code repositories to determine information about one or more release events for the software and visualizing the one or more release events in a timeline view to graphically illustrate a development history of the software.

20 Claims, 8 Drawing Sheets

| Field | Example |
|---|---|
| Product | Beacon |
| Repo name | ap13SS02-requestforquoteservice |
| Repo URL | https://a617913@itec-stash.fmr.com/scm/pr110563/ap13SS02-requestforquoteservice.git |
| Timestamp | 18/09/2020 14:52 |
| Tags | 1.0.1 |
| Source branch | feature/SNTROCK-416-performance-testing |
| Destination branch | develop |
| PR number | 79 |
| JIRA Ticket | CMFI-2463 |
| Commit Hash | 1094ad0c7d522536a70bfd4102beff056b6615b0 |
| Commit Message | Merge pull request #79 in PR110563/ap13SS02-requestforquoteservice from feature/SNTROCK-416-performance-testing to develop |

SYSTEMS AND METHODS FOR SOFTWARE DEPLOYMENT DATA EXTRACTION AND VISUALIZATION

TECHNICAL FIELD

This application relates generally to systems, methods and apparatuses, including computer program products, for extracting and visualizing data related to software development.

BACKGROUND

Maintaining a comprehensive system of record for software deployments is integral to tracking delivery and accuracy of core features and generating notes that assist in the planning of work, capacity and velocity for a software development team. When the technology used in collating and displaying information related to software deployments is cumbersome and difficult to use, it loses its value and reduces the standards of auditing and quality assurance. For example, the current standard relies on manual creation of release information using a heavy, cumbersome tool that is associated with a large maintenance cost. The small set of functionalities provided by the current tools generally do not meet the various needs of individuals within a software development team. Therefore, there is a need for a lightweight, automated solution for tracking and displaying software development data that is scalable, efficient and reusable.

SUMMARY

The present invention features systems and methods for extracting software deployment information directly from version control system (VCS) logs which are automatically generated during a developer's daily work and require minimal manual configuration. The present systems and methods can extract, process and display the data at a rapid, user-friendly pace. The systems and methods of the present invention can also enforce the need for development teams to follow modern best practices by, for example, including automated tagging as a part of the release schedule. Thus, the present invention exposes log data to a new cohort of users beyond just software developers, such as product owners and scrum masters. In some embodiments, the data extracted from the VCS logs is transformed from ledger type one liners into a complex but intuitive timeline, providing insights into the history of a software development cycle. For example, with the extracted data reformatted into a new structure, a user can easily determine what features have been released to production and when they were released. This provides a new way to gain such insights as the VCS logs cannot be modified or tampered with as they are considered an immutable source of truth. In some embodiments, by transforming data into new structures, the present invention can show the user the entire history of a software development project in a timeline view. This provides an important visual as software development progresses into a micro-service based approach, where many code repositories now make it difficult to keep track of the changes across multiple micro-services in a given time frame.

In one aspect, a computer-implemented method is provided for extracting and visualizing data related to software development. The method includes receiving, by a computing device, a plurality of logs corresponding to respective ones of a plurality of code repositories associated with developing the software. Each code repository includes (i) a Version Control System (VCS) configured to maintain the corresponding log and (ii) a plurality of code files associated with the development of the software over a time period. Each log is configured to record changes in the plurality of code files in the corresponding code repository over the time period. The method includes extracting from each log, by the computing device, data including dates of commit and commit messages over the time period associated with the code files. The method also includes analyzing, by the computing device, the extracted data across the plurality of code repositories to determine information about one or more release events for the software. Analyzing the extracted data comprises detecting a plurality of merges to a plurality of master branches across the plurality of code repositories, determining at least one cluster of the plurality of merges in time as an indication of occurrence of a release event, and linking the master branches in the at least one cluster to the release event. The method further includes visualizing, by the computing device, the one or more release events in a timeline view to graphically illustrate a development history of the software.

In another aspect, a computer-implemented system is provided for extracting and visualizing data related to software development. The system comprises an input module configured to receive a plurality of logs corresponding to respective ones of a plurality of code repositories associated with developing the software. Each code repository includes (i) a Version Control System (VCS) configured to maintain the corresponding log and (ii) a plurality of code files associated with the development of the software over a time period. Each log is configured to record changes in the plurality of code files in the corresponding code repository over the time period. The system also includes an extractor module configured to extracting from each log data including dates of commit and commit messages over the time period associated with the code files. The system further includes an analysis module for analyzing the extracted data across the plurality of code repositories to determine information about one or more release events for the software. The analysis module is configured to detect a plurality of merges to a plurality of master branches across the plurality of code repositories, determine at least one cluster of the plurality of merges in time as an indication of occurrence of a release event, and link the master branches in the at least one cluster to the release event. The system also includes a graphical user interface configured to visualize the one or more release events in a timeline view to illustrate a development history of the software.

Any of the above aspects can include one or more of the following features. In some embodiments, the version control system is a GIT system. In some embodiments, the extracted data includes identifiers for the plurality of master branches, the identifiers being used by the computing device to identify the plurality of merges to the master branches in the at least one cluster.

In some embodiments, each merge to a master branch is detected by a "merge to master" log message from the commit messages extracted. In some embodiments, at least one master branch in the cluster is associated with a tag signaling the occurrence of the release event. In some embodiments, the plurality of merges in the at least one cluster are determined using a density-based clustering algorithm.

In some embodiments, the timeline view includes a calendar view of the release events organized by calendar days. In some embodiments, the timeline view includes a chronological listing of the release events, where each listing includes a description of released components for the corresponding release event, version numbers of the released components and application information for the released components. In some embodiments, each released component is linked to at least one of (i) a related data section of a code repository in the plurality of code repositories or (ii) a related data section of a project planning and issue tracking system, such that upon a user clicking on the listing, the computing device is configured to bring forth the related data sections to access additional details about the released component. In some embodiments, the plurality of code repositories is hosted by Bitbucket. In some embodiments, the project planning and issue tracking system is Jira.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
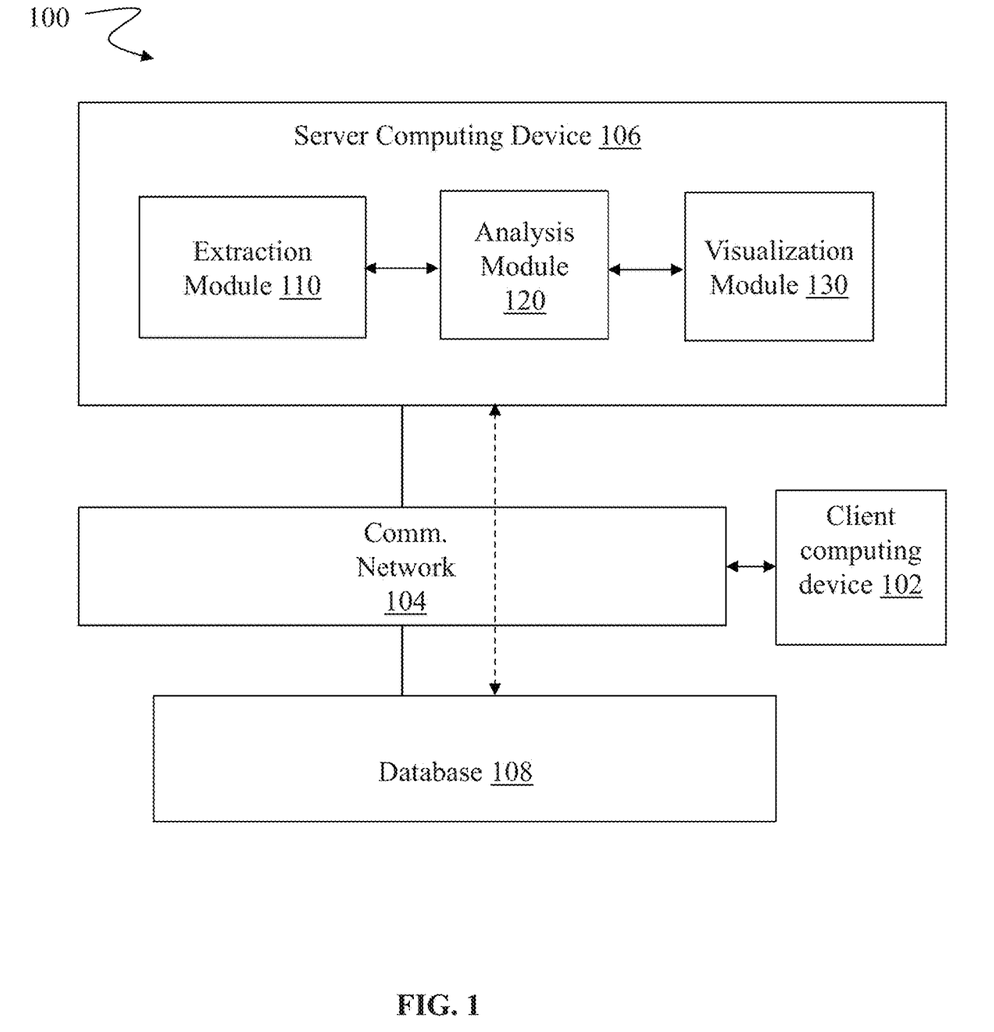
FIG. 1 shows an exemplary diagram of a system used in a computing environment to track and visualize software development data, according to some embodiments of the present invention.

FIG. 1 shows an exemplary diagram of a system 100 used in a computing environment to track and visualize software development data, according to some embodiments of the present invention. As shown, the system 100 generally includes a client computing device 102, a communication network 104, a server computing device 106 and a database 108.

The client computing device 102 connects to the communication network 104 to communicate with the server computing device 106 and/or the database 108 to provide inputs and receive outputs relating to the process of software development data extraction and visualization as described herein. For example, the client computing device 102 can display to a user a detailed graphical user interface (GUI) that allows the user to track/view pertinent software development data in a user-configuration display environment. Exemplary client computing devices 102 include, but are not limited to, desktop computers, laptop computers, tablets, mobile devices, smartphones, and internet appliances. In some embodiments, a user accesses the server computing device 106 via an Application Programming Interface (API) connected to the client computing device 102. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables components of the system 100 to communicate with each other to perform the process of software development performance data tracking and visualization. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more processors and one or more physical memory modules and specialized software engines that execute on the processor of the server computing device 106, to receive data from other components of the system 100, transmit data to other components of the system 100, and perform functions as described herein. As shown, the processor of the server computing device 106 executes an extraction module 110, an analysis module 120 and a visualization module 130, where the sub-components and functionalities of these components are described below in detail. In some embodiments, the components 110, 120, 130 of the server computing device 106 are specialized sets of computer software instructions programmed onto a dedicated processor in the server computing device 106 and can include specifically-designated memory locations and/or registers for executing the specialized computer software instructions. In some embodiments, the visualization module 130 is configured to process data for display in the user interface of a client computing device 102.

The database 108 is a computing device (or in some embodiments, a set of computing devices) that is coupled to and in data communication with the server computing device 106 and is configured to provide, receive and store various types of data needed and created for tracking and visualizing software development performance data, as described below in detail. In some embodiments, all or a portion of the database 108 is integrated with the server computing device 106 or located on a separate computing device or devices. For example, the database 108 can comprise one or more databases, such as MySQL™ available from Oracle Corp. of Redwood City, California.

Figure 2:
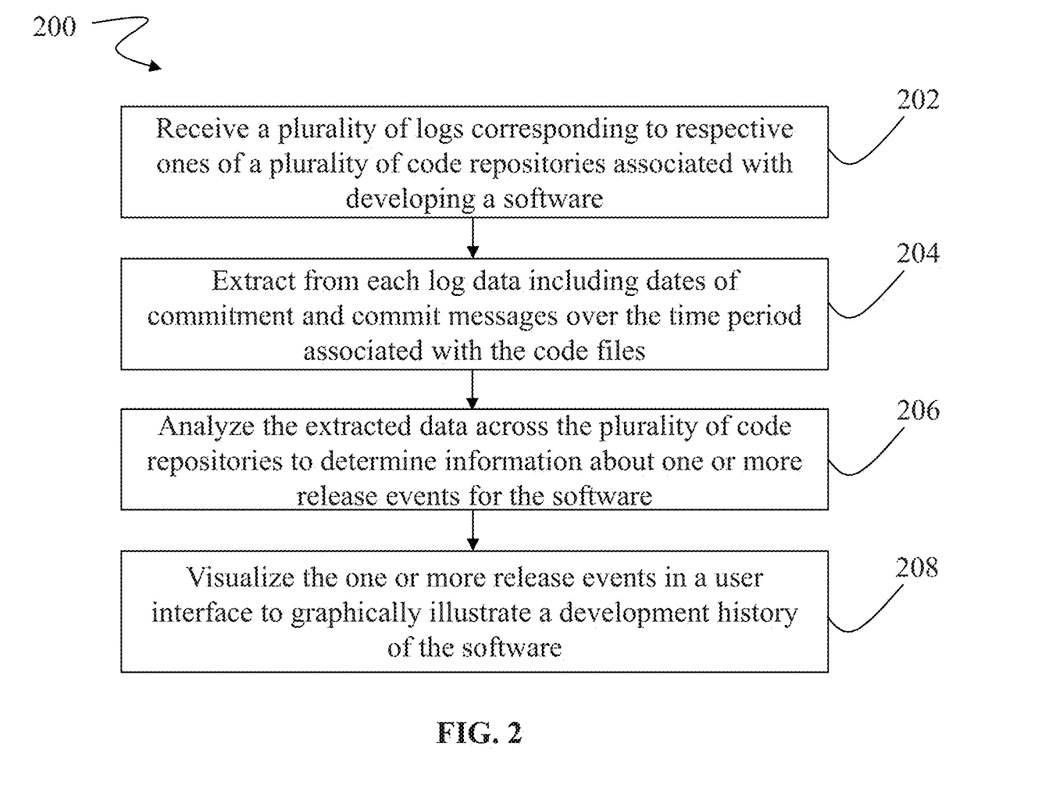
FIG. 2 shows an exemplary process implemented by the system of FIG. 1 to track and visualize software development performance data, according to some embodiments of the present invention.

FIG. 2 shows an exemplary process 200 implemented by the system 100 of FIG. 1 to track and visualize software development performance data, according to some embodiments of the present invention. The process 200 starts with receiving, by the system 100, multiple logs corresponding to respective ones of multiple code repositories associated with developing a software product (step 202). Each code repository includes a Version Control System (VCS), which is a software utility that maintains a log to track and manage changes to a code file system. Exemplary VCS's include GIT, Subversion and Mercurial. Each code repository also includes one or more software code files associated with the development of the software product. Thus, each VCS log in a code repository is configured to record changes in these code files over time (e.g., additional of new software features), such as from the beginning to the end of the software development cycle. For example, a VCS log for a code repository can record every code change that takes place in the code files of the code repository, from a code commit level, which may involve small incremental changes, to a code merge level, which may involve larger code changes, such as a new feature being added. Data in a VCS log has been traditionally ignored as a source of insight into developer workload and software development progression tracking, as it is generally not user friendly with terse and compact language. In some embodiments, a user supplies to the system 100 as inputs a list of one or more code repositories associated with developing a software product.

Figure 3:
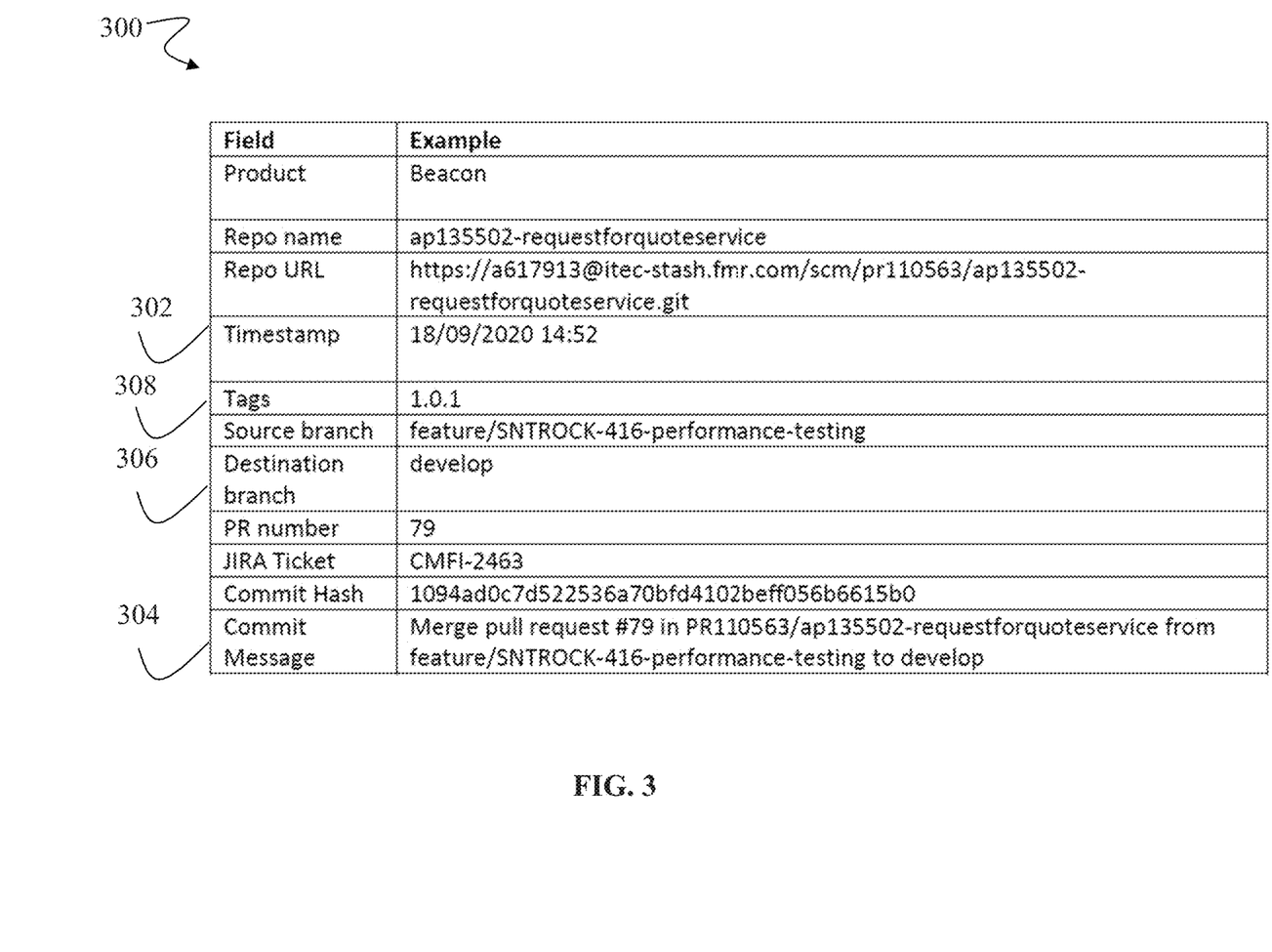
FIG. 3 shows an exemplary intermediary file to which extracted log data is written by the extractor module of the system of FIG. 1, according to some embodiments of the present invention.

Next, the extractor module 110 of the system 100 is configured to extract from the VCS logs pertinent data to track the progress of developing the software product (step 204). To accomplish this, the extractor module 110 is able to access the set of code repositories (with or without credentials) and load their corresponding VCS logs. The extractor module 110 then extracts data from the VCS logs in the internal VCS. The extract module 110 can further transform and aggregate the extracted data into an intermediary file. For example, the extractor module 110 can detect "merge to master" log messages in the VCS logs, which signals a possible release event for the software product, and extract certain information from each "merge to master" log message, such as a timestamp, one or more version tags, a source branch identifier, a destination branch identifier, and a commit message. FIG. 3 shows an exemplary intermediary file 300 to which extracted log data is written by the extractor module 110 of the system 100 of FIG. 1, according to some embodiments of the present invention. The extractor module 110 is configured to parse a VCS log and extract a "merge to master" log message from the VCS log. Further, the extractor module 110 is configured to extract from each log message information about (i) code merges to a VCS branch (e.g., a master branch) from which one or more releases are made and (ii) references to work ticket identifiers (e.g., Jira story identifiers) in the code merge comments and/or branch names. For example, for every detected code merge to a master branch (i.e., in a "merge to master" log message), the extractor module 110 can extract a date of commit, as shown in field 302 of file 300, identification of a destination branch to which the merge occurs, as shown in field 306, and a commit message that includes identification information, as shown in field 304 of file 300. In some embodiments, one or more tags are extracted to obtain version information, as shown in filed 308 of file 300. In some embodiments, the extractor module 110 is configured to perform such data extraction over a specific time period associated with the code files, such as for the entire duration of the software product development cycle. In some embodiments, data extraction of a VCS log is a single-pass operation that is run manually or automatically. In some embodiments, extract of a VCS log is run on a periodic basis to rebuild data or augment existing data from a specified starting point.

Subsequently, the analysis module 120 of the system 100 is able to analyze the extracted data across the multiple code repositories to determine information about one or more release events for the software product (step 206). In some embodiments, the analysis module 120 is configured to analyze the intermediary files 300 generated by the extractor module 110 to detect the release events. More specifically, to detect a release event across multiple code repositories, the analysis module 120 can analyze the identifiers and tags that are assigned to a master branch each time a merge takes place, which can signal the occurrence of a release event. For example, the analysis module 120 is able to detect a merge to a master branch via the destination branch identifier (e.g., "destination branch" field 306 of intermediary file 300) and the associated date of commit in field 302 of file 300. In addition, the tag (e.g., "tags" field 308 of intermediary file 300) can be used by the analysis module 120 to identify the related release version. In some cases, a common convention is used by the code repositories to identify merges and releases. For example, all code repositories can be configured to use a common branching practice (e.g., GitFlow or trunk). However, the analysis module 120 is configured to support multiple different conventions on a per-repository and/or per-team basis to detect merges and identify release events.

In some embodiments, the analysis module 120 is configured to detect a merge to a master branch in a code repository and use this as an indication of occurrence of a release event or a part of a release event. In some embodiments, a release comprises multiple merges to a master branch across any number of repositories. Thus, to detect a release event in this scenario, the analysis module 120 is configured to detect multiple merges that are clustered together in time (e.g., by analyzing the commit messages and commit timestamps) as an indication that a release event has occurred. For example, the cluster can be based on a window of time within which the merges occur, such as a 3-day window to cluster merges. As another example, a clustering algorithm can be used, such as a density-based clustering algorithm (e.g., DBSCAN or OPTICS algorithm). The analysis module 120 is configured to link the cluster of merges across the repositories to a single release event based on, for example, the names of the master branches.

In some embodiments, the analysis module 120 is configured to produce distilled data points, each corresponding to a release-to-production event and present information about the release event aggregated across the code repositories, such as Jira work items completed as a part of the release event. In some embodiments, using the timestamps inherent to a log-based data source, the analysis module 120, in cooperation with the visualization module 120, is configured to plot the distilled data points in a timeline view, a table view and/or a calendar view. In some embodiments, the analysis module 120, in cooperation with the visualization module 120, allow the user access to the data points and the visualizations produced by the system 100. Details regarding the data visualization aspect of the present technology is described below in relation to FIGS. 4-8.

Figure 4:
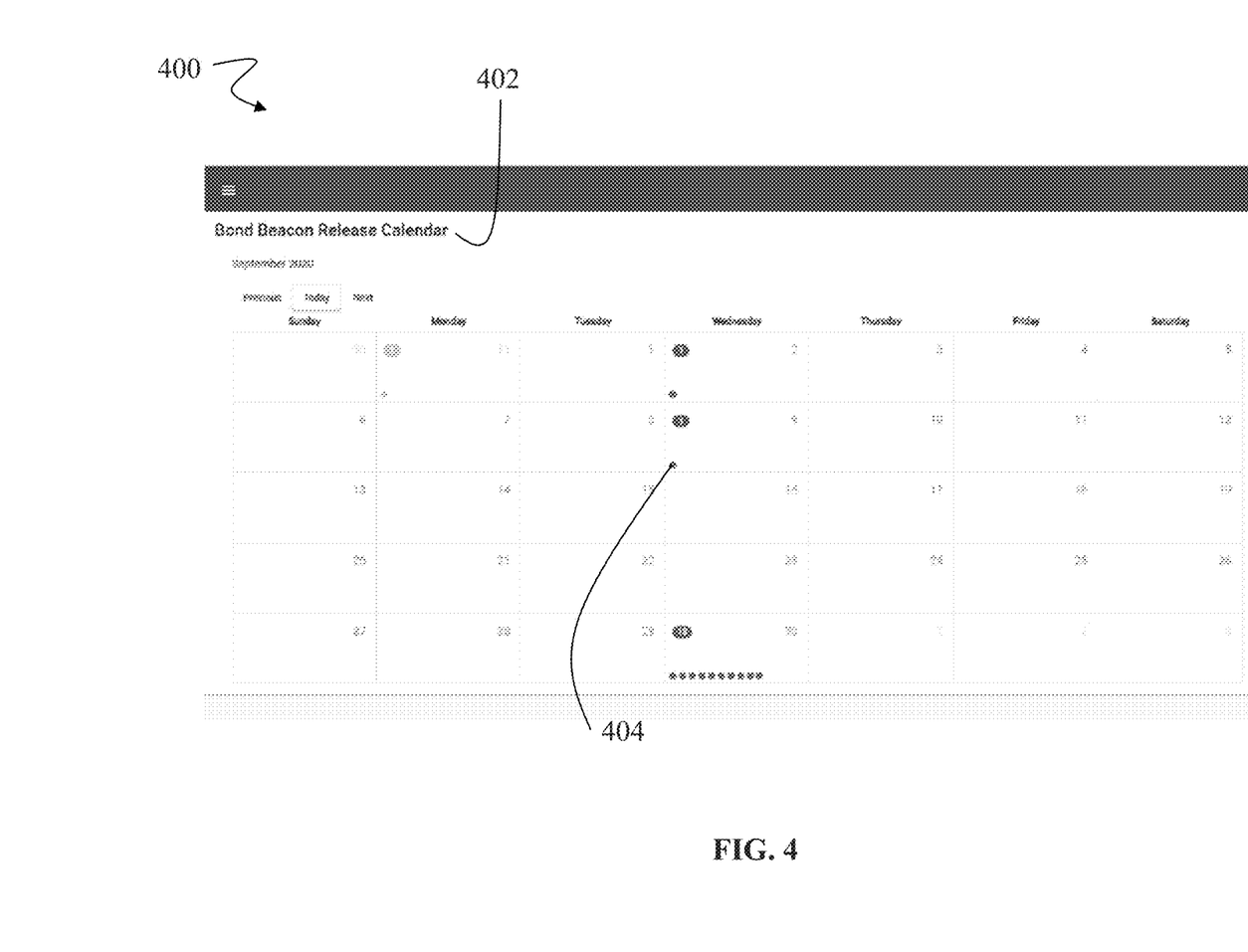
FIG. 4 shows an exemplary user interface produced by the visualization module of the system of FIG. 1 to illustrate a calendar view of the development of a software product, according to some embodiments of the present invention.

After one or more release events are detected by the analysis module 120, the visualization module 130 is configured to visualize the release events in one or more user interfaces to graphically illustrate a development history of the software product (step 208). FIG. 4 shows an exemplary user interface 400 produced by the visualization module 130 of the system 100 of FIG. 1 to illustrate a calendar view of the development history of a software product, according to some embodiments of the present invention. More specifically, the user interface 400 presents a high-level calendar view of the release event occurrences associated with a software product 402, which is identified in the upper left corner of the interface 400. The release events are denoted by one or more dots 404 on their corresponding release/ commit dates as shown in the calendar view, where each dot 404 represents a code repository. In some embodiments, fields 302 and 306 of the intermediary file 300 of FIG. 3 are used to produce each dot icon 404 for each code repository. For example, a dot icon 404 can be placed in the calendar based on the commit date in field 302. As shown in FIG. 4, for the release event of Sep. 1, 2021 there is only 1 associated repository and for the release event of Sep. 30, 2021 there are 10 associated repositories. From the calendar view of the user interface 400, a user can drill down by clicking on a dot icon 404 of a release event to further investigate the corresponding code repository with releases on that day.

Figure 5:
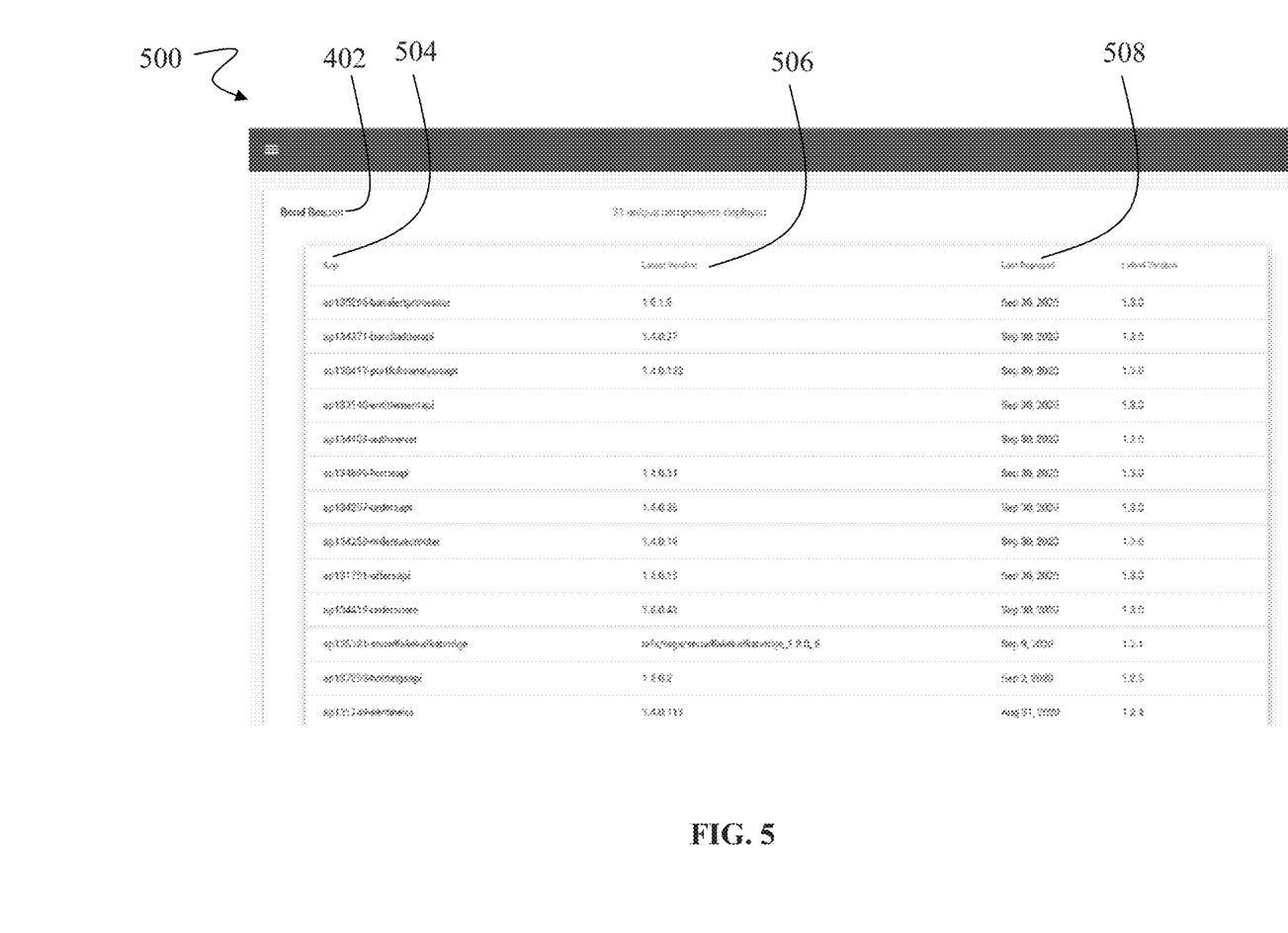
FIG. 5 shows another exemplary user interface produced by the visualization module of the system of FIG. 1 to illustrate a table view of the development of the same software product of FIG. 4, according to some embodiments of the present invention.

In addition, the user can choose to display the release events associated with the software product 402 in a table format. FIG. 5 shows another exemplary user interface 500 produced by the visualization module 130 of the system 100 of FIG. 1 to illustrate a table view of the development of the same software product 402 of FIG. 4, according to some embodiments of the present invention. As shown, the user interface 500 presents a table of released components by name 504 correlated to their version numbers 506 and their release dates 508. In some embodiments, field 302 (commit date), field 306 (destination branch) and field 308 (version tags) of the intermediary file 300 of FIG. 3 for each related code repository are used to produce the table entries.

Figure 6:
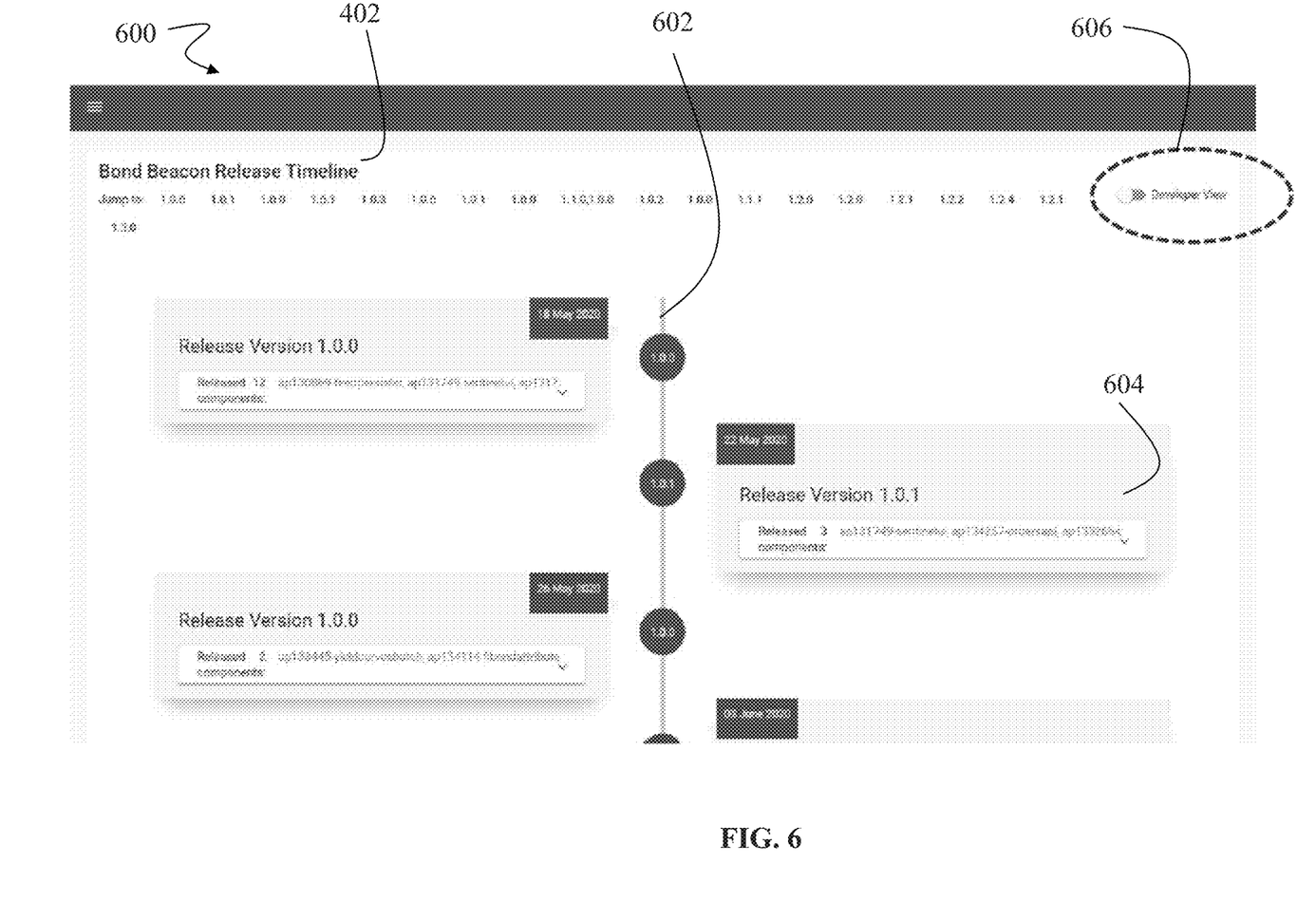
FIG. 6 shows another exemplary user interface produced by the visualization module of the system of FIG. 1 to illustrate a chronological timeline view of the development of the same software product of FIG. 4, according to some embodiments of the present invention.
Figure 7:
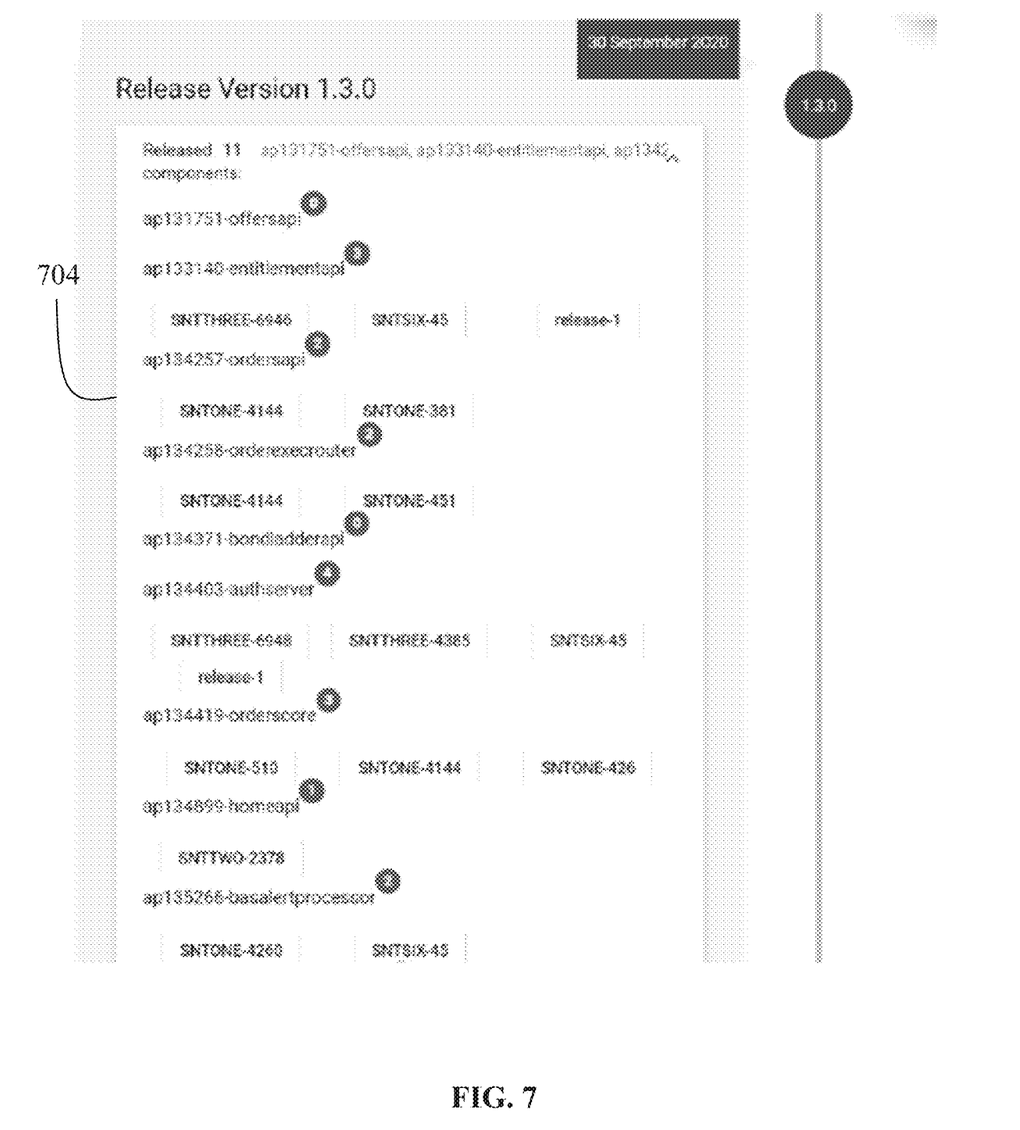
FIG. 7 shows an exemplary expanded text box that provides additional information about a released component of FIG. 6, according to some embodiments of the present invention.

In some embodiments, the visualization module 130 can present a chronological timeline view of the released components 504 for the software product 402. FIG. 6 shows another exemplary user interface 600 produced by the visualization module 130 of the system 100 of FIG. 1 to illustrate a chronological timeline view of the development of the same software product 402 of FIG. 4, according to some embodiments of the present invention. As shown, the user interface 600 presents a timeline 602 of release event occurrences for various released components 504. For each released component on the timeline 602, the user interface 600 can provide a text box 604 showing a description of the released component, including the name of the released component 504, its version number 506 and other application information. Upon the user clicking on a particular text box 604 associated with a released component 504, the user interface 600 can expand the text box 604 to provide additional information about the released component. FIG. 7 shows an exemplary expanded text box 704 that provides additional information about a released component of FIG. 6, according to some embodiments of the present invention. In some embodiments, information used to populate each text box 604 is from the intermediary file 300 of FIG. 3, including from field 302 (commit date), field 306 (destination branch), field 308 (version tags), and field 304 (commit message identifying Jira ticket number and PR number).

Figure 8:
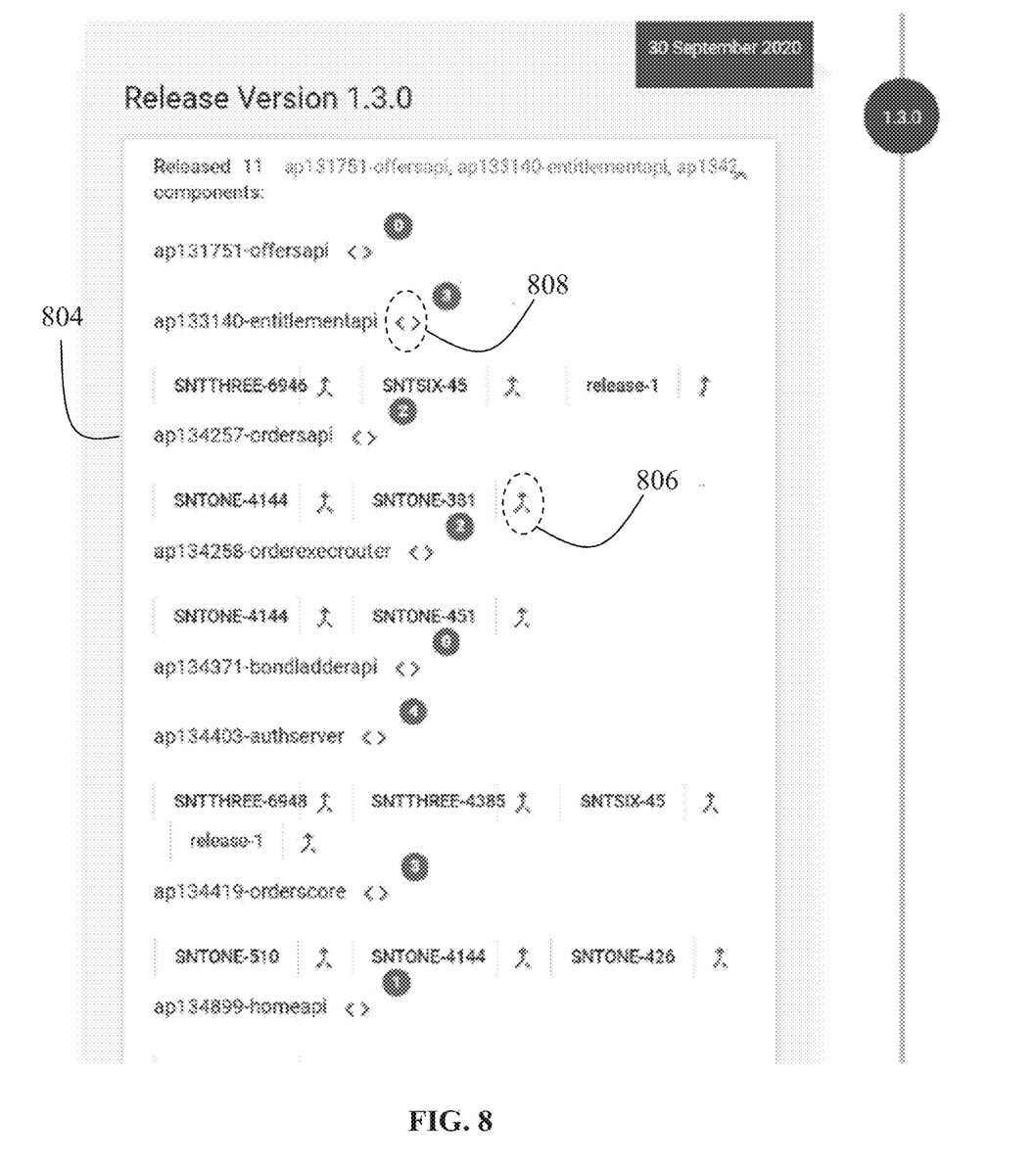
FIG. 8 shows an exemplary expanded text box that provides additional information about a released component of FIG. 6 when the "developer view" button is activated, according to some embodiments of the present invention.

Referring back to FIG. 6, in some embodiments, the user can activate a "developer view" button 606 of the user interface 600 of FIG. 6 that provides a different perspective of the software development history when toggled. For example, FIG. 8 shows an exemplary expanded text box 804 that provides additional information about a released component of FIG. 6 when the "developer view" button 606 is activated, according to some embodiments of the present invention. In comparison to the information provided in the text box 704 of FIG. 7, the text box 804 is configure to provide more granular details about the same released component. As shown, the text box 804 can annotate certain work items with a branch icon 808 about the state of the code repository at the time of the release. The arrow icon 806 represents a link to an external VCS system (e.g., Bitbucket) to show the user relevant code files in the corresponding code repository at the time of the release (as opposed to their current state). The text box 804 can also annotate certain work items with an arrow icon 806 showing the final pull request for the release. The branch icon 808 represents a link to an external VCS system (e.g., Bitbucket) to show the user code changes that happened as a part of that work item. In some embodiments, each of the branch icons 808 and arrow icons 806 is a link to a related data section of a code repository in a VCS system (e.g., Bitbucket). In some embodiments, each work item identifier in the text box 804 is a link to a project planning and issue tracking system (e.g., Jira) to show the user codes related to that work item. In general, upon a user clicking on any one of these links, the use can access the related data section in the code repository or tracking system to obtain additional details about the corresponding released component.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®, Google® Cloud).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for extracting and visualizing data related to software development, the method comprising:

receiving, by a computing device, a plurality of logs corresponding to respective ones of a plurality of code repositories associated with developing the software, wherein each code repository includes (i) a Version Control System (VCS) configured to maintain the corresponding log and (ii) a plurality of code files associated with the development of the software over a time period, each log being configured to record changes in the plurality of code files in the corresponding code repository over the time period;

extracting from each log, by the computing device, data including dates of commit and commit messages over the time period associated with the code files;

analyzing, by the computing device, the extracted data across the plurality of code repositories to determine information about one or more release events for the software, analyzing the extracted data comprising:

detecting a plurality of merges to a plurality of master branches across the plurality of code repositories;

determining at least one cluster of the plurality of merges in time as an indication of occurrence of a release event; and linking the master branches in the at least one cluster to the release event; and visualizing, by the computing device, the one or more release events in a timeline view to graphically illustrate a development history of the software.

2. The computerized method of claim 1, wherein the version control system is a GIT system.

3. The computerized method of claim 1, wherein each merge to a master branch is detected by a "merge to master" log message from the commit messages extracted.

4. The computerized method of claim 1, wherein the extracted data includes identifiers for the plurality of master branches, the identifiers being used by the computing device to identify the plurality of merges to the master branches in the at least one cluster.

5. The computerized method of claim 1, wherein at least one master branch in the cluster is associated with a tag signaling the occurrence of the release event.

6. The computerized method of claim 1, wherein the plurality of merges in the at least one cluster are determined using a density-based clustering algorithm.

7. The computerized method of claim 1, wherein the timeline view includes a calendar view of the release events organized by calendar days.

8. The computerized method of claim 1, wherein the timeline view includes a chronological listing of the release events, each listing including a description of released components for the corresponding release event, version numbers of the released components and application information for the released components.

9. The computerized method of claim 8, further comprising linking, by the computing device, each released component to at least one of (i) a related data section of a code repository in the plurality of code repositories or (ii) a related data section of a project planning and issue tracking system, such that upon a user clicking on the listing, the computing device is configured to bring forth the related data sections to access additional details about the released component.

10. The computerized method of claim 9, wherein the plurality of code repositories is hosted by Bitbucket.

11. The computerized method of claim 9, wherein the project planning and issue tracking system is Jira.

12. A computerized system for extracting and visualizing data related to software development, the system comprising:
an input module configured to receive a plurality of logs corresponding to respective ones of a plurality of code repositories associated with developing the software, wherein each code repository includes (i) a Version Control System (VCS) configured to maintain the corresponding log and (ii) a plurality of code files associated with the development of the software over a time period, each log being configured to record changes in the plurality of code files in the corresponding code repository over the time period;
an extractor module configured to extract data from each log data including dates of commit and commit messages over the time period associated with the code files;
an analysis module for analyzing the extracted data across the plurality of code repositories to determine information about one or more release events for the software, wherein the analysis module is configured to:
detect a plurality of merges to a plurality of master branches across the plurality of code repositories;
determine at least one cluster of the plurality of merges in time as an indication of occurrence of a release event; and
link the master branches in the at least one cluster to the release event; and
a graphical user interface configured to visualize the one or more release events in a timeline view to illustrate a development history of the software.

13. The computerized system of claim 12, wherein the plurality of merges in the at least one cluster are determined using a density-based clustering algorithm.

14. The computerized system of claim 12, wherein the timeline view includes a chronological listing of the release events, each listing including a description of released components for the corresponding release event, version numbers of the released components and application information for the released components.

15. The computerized system of claim 14, wherein the graphical user interface links each released component to at least one of (i) a related data section of a code repository in the plurality of code repositories or (ii) a related data section of a project planning and issue tracking system, such that upon a user clicking on the listing, the computing device is configured to bring forth the related data sections to access additional details about the released component.

16. The computerized system of claim 15, wherein the project planning and issue tracking system is Jira.

17. The computerized system of claim 12, wherein the version control system is a GIT system.

18. The computerized system of claim 12, wherein the plurality of code repositories is hosted by Bitbucket.

19. The computerized system of claim 12, wherein each merge to a master branch is detected by a "merge to master" log message from the commit messages extracted.

20. The computerized system of claim 12, wherein at least one master branch in the cluster is associated with a tag signaling the occurrence of the release event.

* * * * *